J. W. T. OLÁN.
MARINER'S COMPASS.
APPLICATION FILED DEC. 5, 1917.

1,307,637.

Patented June 24, 1919.

J. W. T. Olan
Inventor.

By *Albert N. Parker*
Attorney

UNITED STATES PATENT OFFICE.

JOHAN WILHELM THEODOR OLÁN, OF MARSTRAND, SWEDEN.

MARINER'S COMPASS.

1,307,637.  Specification of Letters Patent.  Patented June 24, 1919.

Application filed December 5, 1917. Serial No. 205,604.

*To all whom it may concern:*

Be it known that I, JOHAN WILHELM THEODOR OLÁN, a subject of the King of Sweden, residing at Marstrand, in the county of Gottenborg and Bohus and Kingdom of Sweden, have invented new and useful Improvements in Mariners' Compasses, of which the following is a specification.

This invention refers to compasses and especially to those of the mariner's type and has for its object to remove the drawbacks connected with compasses on board of ships where the blows exerted on the ship by the waves when moving ahead in heavy seas, are likely to set up undue shocks on the compass proper, disturbing the pivots thereof and influencing the exact operation of the movable members in the compass. Another object of this invention is to reduce the load of the rotatable card and its magnet needles on the pivot though preserving a powerful magnetic moment by means of strong and consequently rather heavy magnets.

It has been proposed to make use of a floating member suspended below the compass card and carried by a pivot working in stone fitted or jewel bearings for the object of removing a portion of the load of said parts.

In accordance with this invention the compass card and its magnetic system is supported in the usual way upon a rigid steel point or pivot, but this pivot is fixed on the top of a floating member supported by a liquid of such a specific gravity compared with the volume of the float and the weight of the float and the parts carried by the same, that said system does not produce any positive thrust. The result of this arrangement is that the compass card is easily movable and is not influenced by shocks or vibrations on the compass box also in compasses with extraordinarily heavy magnets and consequently powerful magnetic moments, such shocks or vibrations are compensated by the floating property of the member, thus saving the pivots from undue strain.

In the accompanying drawing—

Figure 1:
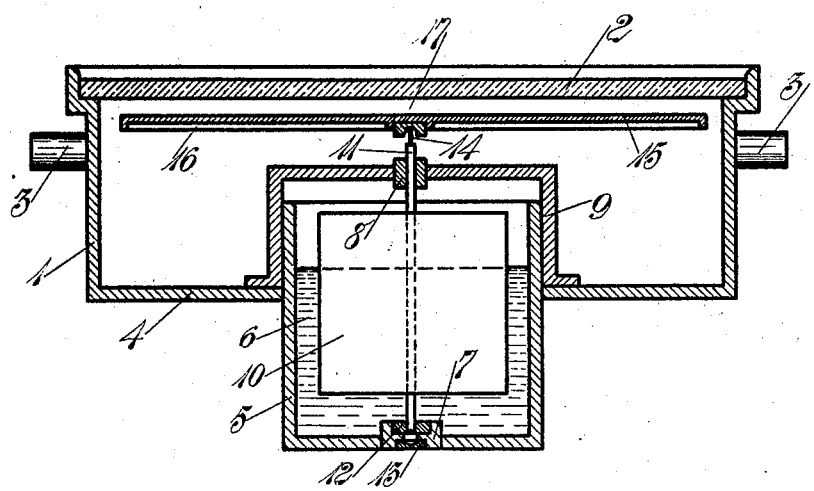

Figure 1 represents a sectional view of the improved compass and

Figure 2:
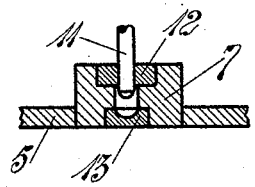

Fig. 2, on enlarged scale, a vertical section through the bottom bearing block.

The compass box 1 is covered by a glass 2 and provided with journals 3 for the usual cardan suspension. The mid portion of the bottom 4 of the box carries a cylinder 5, supplied with a liquid 6 of any suitable density, preferably mercury, and provided with a bottom bearing 7 and an upper or top bearing 8 arranged in a cover or cross bridge 9.

A substantially cylindrical float 10 is inserted into the liquid 6 and carried by a vertical shaft 11, journaled in the bottom and top bearings 7 and 8 respectively, which bearings preferably may be provided with stone fittings or jewels, such as indicated at 12 in the bottom bearing. The last mentioned bearing may also be fitted with a stone or jewel 13 in the bottom to support the thrust or load of the floating system, if the liquid 6 should be removed.

The shaft 11 projects above the bearing 8 and is formed into a polished steel point or pivot 14 on which the compass card 15 with the magnetic needles 16 is suspended by means of a stone fitting or jewel 17.

When operative the liquid 6 supports the float 10, so that the shaft 11 is prevented from touching the bottom stone 13, and consequently the shaft 11 is supported or guided only sidewise or laterally by the stone fitted bearings 7 and 8.

The compass card rotates about the pivot 14 as in a compass of any usual type, and this pivot is protected from being damaged, when the compass box 1 is subjected to shocks or blows due for instance to the movements of the ship. If the friction between pivot 14 and its jewel 17 for any reason should exceed a certain degree, the friction between the liquid 6 and the float 10 is sufficiently low to allow a free revolving of the float and the suspended magnetic system.

Having thus particularly described my invention and the manner of its operation, what I claim as new and desire to protect by Letters Patent is—

1. A mariner's compass comprising means for containing a liquid, a floatable member arranged in said liquid and supported thereby, a spindle carried by said floatable member and provided with a pivot at its upper end, upper and lower bearings laterally engaging said spindle, a compass card pivotally supported upon the aforesaid pivot, and a magnetic system carried by said compass card.

2. A mariner's compass as claimed in claim 1, wherein an end thrust bearing is provided beneath the lower end of the spindle and the liquid is of a density to hold the spindle entirely removed from said bearing.

In testimony whereof I have affixed my signature in presence of two witnesses.

JOHAN WILHELM THEODOR OLÁN.

Witnesses:
GUSTAF GERTZ,
ALEX FOYELBAUM.

Copies of this patent may be obtained for five cents each, by addressing the "Commissioner of Patents, Washington, D. C."